R. ELLWOOD.
Horse Hay-Rake.

No. 214,497.

Patented April 22, 1879.

3 Sheets—Sheet 1.

Witnesses:

Inventor
Reuben Ellwood
By West & Bond Attys

3 Sheets—Sheet 2.

R. ELLWOOD.
Horse Hay-Rake.

No. 214,497. Patented April 22, 1879.

Witnesses:

Inventor:
Reuben Ellwood
By West & Bond Attys

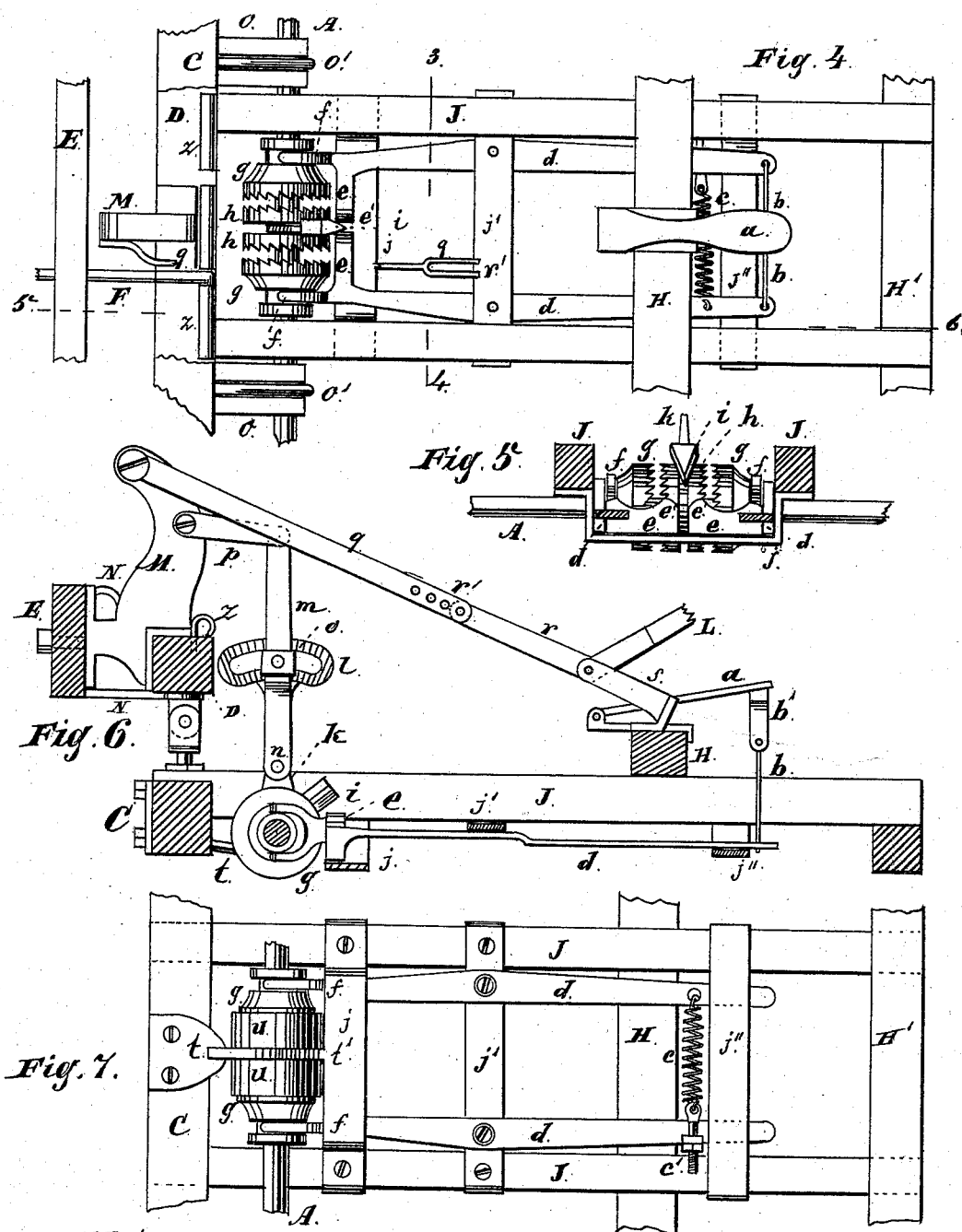

UNITED STATES PATENT OFFICE.

REUBEN ELLWOOD, OF SYCAMORE, ILLINOIS.

IMPROVEMENT IN HORSE HAY-RAKES.

Specification forming part of Letters Patent No. 214,497, dated April 22, 1879; application filed September 24, 1878.

*To all whom it may concern:*

Be it known that I, REUBEN ELLWOOD, of Sycamore, DeKalb county, State of Illinois, have invented new and useful Improvements in Horse Hay-Rakes, of which the following is a full description, reference being had to the accompanying drawings, in which—

Figure 1:
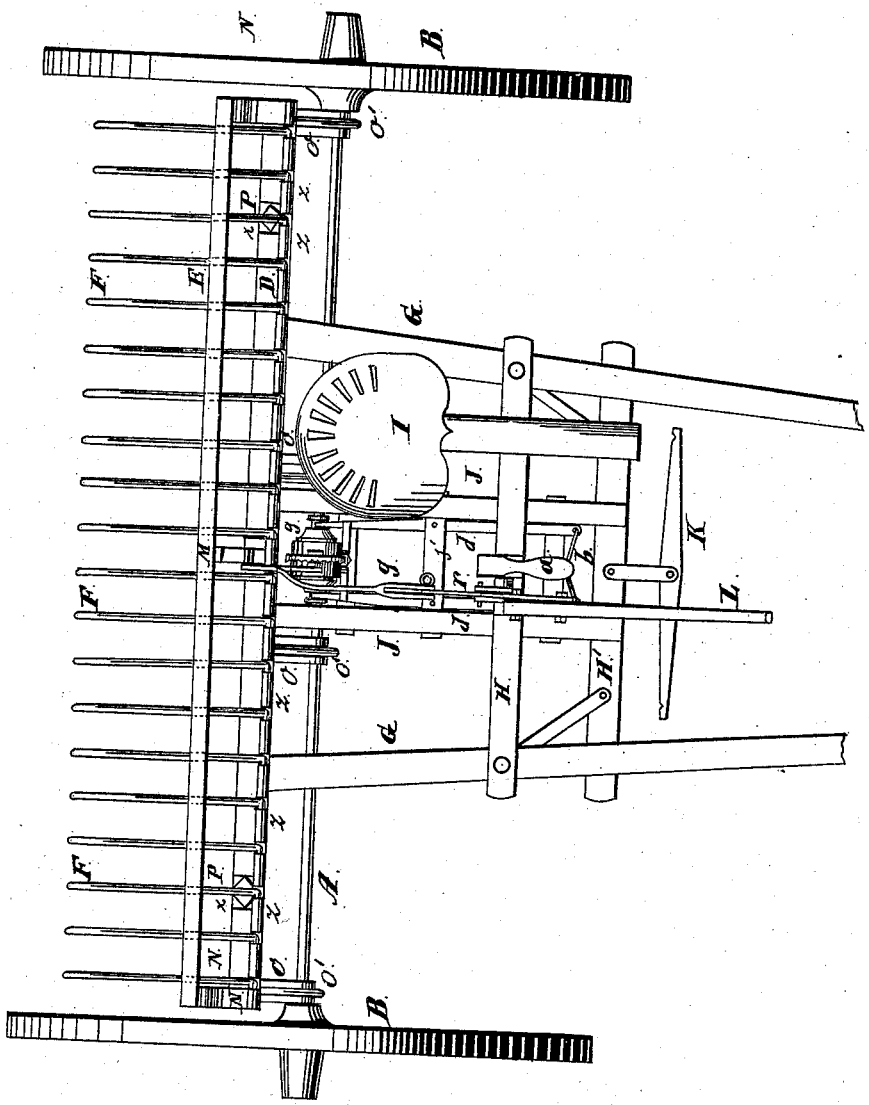
Figure 2:
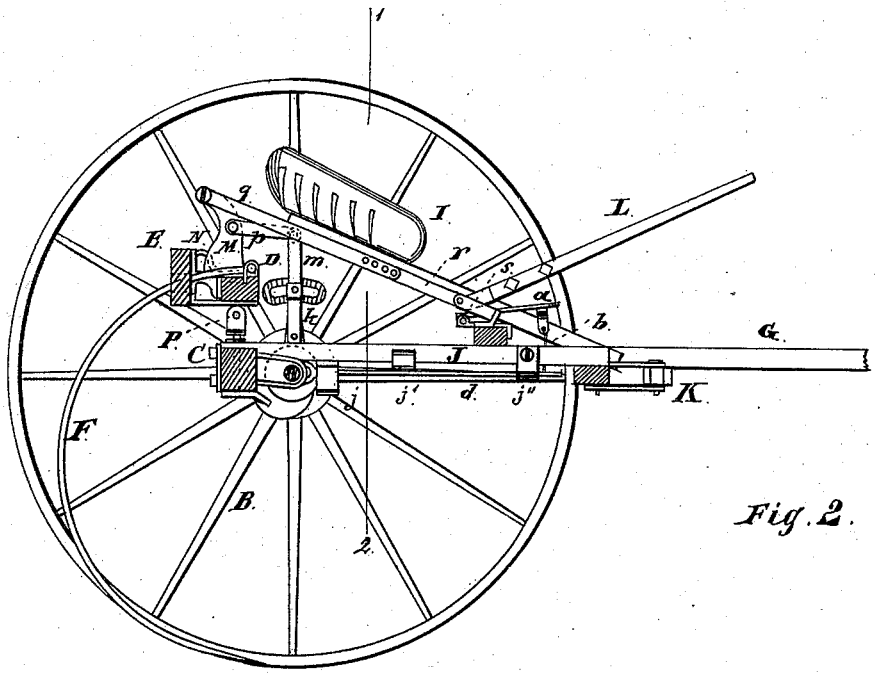
Figure 3:
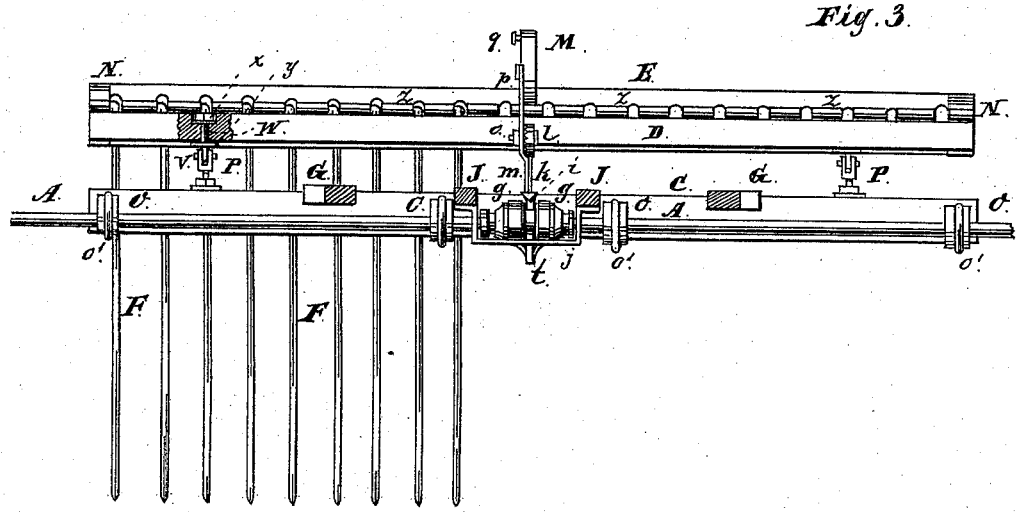

Figure 1 is a top or plan view; Fig. 2, a cross-section; Fig. 3, a section on line 1 2 of Fig. 2; Fig. 4, a top view of the parts between the thills, enlarged; Fig. 5, a cross-section on line 3 4 of Fig. 4; Fig. 6, a longitudinal section on line 5 6 of Fig. 4; Fig. 7, an under or reverse view of the parts shown in Fig. 4.

My improvements relate to that class of horse-hay-rakes known as "self-dumpers," where the rake-head is disconnected from the axle; and the invention consists in the construction and combination of devices for automatically operating the rake from the axle and adjusting the throw of the same, and also in the construction and combinations of devices for operating the rake by a treadle, all substantially as hereinafter more fully set forth.

In the drawings, A indicates the axle; B B, the wheels; C, the rear bar, upon which the rake-head is mounted; D, the rake-head; E, the slotted rear guide for the teeth; F, the teeth; G, the thills; H H', cross-bars connecting the thills together; I, driver's seat; J J, bars between the thills for supporting and operating the clutch-levers; K, whiffletree; L, hand-lever for discharging the rake; M, lever block or arm by which the tilting devices are connected with the rake head or frame; N, brackets or castings by which the slotted guide-board E is supported in position; O, boxes or axle-bearings; O', straps or clasp-bands for securing the axle-bearings; P, couplings or hinged standards, by means of which the rake-head is supported on the main frame or bar C; *a*, treadle having an under projection, *b'*; *b b*, rods connecting the treadle with the outer end of the clutch-levers; *c*, spring for holding the clutches out of contact by its action on the clutch-levers; *d d*, clutch-levers; *e e*, side projections on the rear ends of the levers *d*; *f f*, yokes for operating the clutches; *g g*, clutches; *h*, lever-head, upon which the clutches operate; *i*, incline or wedge operating upon the inclines *e'* of the lever projections *e* to spread or detach the clutches; *j j' j''*, supporting-plates for the levers *d*, forming also the connections between the bars J J; *k*, arm or lever of the head *h*; *l*, enlarged upper end of the arm *k*, having one side radially serrated, and having also a slot, through which the set-screw *o* passes; *m*, upper section of the arm or lever of the head *h*; *n*, pivot by which the upper section is connected with the lower section, *k*, of the lever or arm of the head *h*; *o*, set-screw or bolt for locking the sections *m k* together when in the desired position; *p*, rod or bar connecting the section *m* with the arm M; *q*, pivoted rod for connecting the arm M with the hand-lever L; *r'*, perforated joint or fork, by means of which the length of the rod *q* is adjusted, so as to bring the hand-lever L within convenient reach of the driver or operator; *r*, rear projecting arm of the lever L; *s*, bracket, to which the lever L is pivoted; *t*, a plate located beneath the bar C, and having a projection fitting the groove *t'* of the head *h* to prevent the head from moving along the axle, so as to come in contact with either clutch; *u*, covers or housings to keep hay or dirt out of the clutches; *v*, joint in the standards P; *w*, screw-rod or bolt passing through the head D; *x*, upper, and *y* lower, screw-nuts, by means of which the rake-head D can be raised or lowered, and the rake-teeth adjusted to their proper relative positions; and *z*, sockets, into which the bent upper ends of the teeth are inserted to enable them to "articulate" or have independent movements.

The axle A is made to revolve with the wheels, which may be attached thereto with clutches or other suitable device to enable each to have a separate or independent movement in turning or backing.

The rake teeth and head are made in the ordinary manner, as shown, and the rake-head is connected with the main cross-bar by a jointed standard, P, Fig. 3, so that the rocking or movement of the bar C on the axle will not disturb the teeth; and in order to adjust the height of the teeth, which also to a certain extent adjusts their pitch, I have provided the post *w* with a screw-thread and with a nut, *y*, below and a nut, *x*, above, so as to adjust the height of the rake-head or the space between it and the bar C; otherwise the rake-frame is made, and the teeth, seat, and thills, are attached, in the usual manner.

Between the thills I attach a secondary frame, composed of the bars J J and cross bars or plates $j\,j'\,j''$, and within this frame or between the bars J there is located upon the axle and turning upon it a lever-head, $h$, which has its ends provided with teeth or cogs corresponding with those of the clutches $g$. This head is made in two parts, both of which are firmly attached to the arm $k$, or it is made of one piece and provided with a groove, $t'$, into which the plate $t$, Fig. 7, passes sufficiently far to prevent any end movement of this head $h$.

The arm $k$ extends upward and has an enlargement, $l$, at its top, which is provided with teeth radiating from the pivot $n$, which teeth engage with corresponding ones on the side of the arm or section $m$. These teeth or notches are held in contact by the bolt or set-screw $o$ passing through a slot in the part $l$, as shown. The slot, however, is not essential, as the part $l$ may be a single curved bar with the set-screw or bolt placed above it; and a series of holes in the head $l$, with a pin in the part $m$, may be used in place of the teeth or serrations, although the teeth shown are preferred. By this arrangement the height to which the rake-teeth are to be thrown in discharging can be adjusted; for when the adjustment is made backward, the wedge $i$ comes sooner in contact with the side arms $e$ of the levers $d$, and there is a less lift of the rake-teeth, and when adjusted forward the lift of the rake-teeth is increased. The block or arm M is made of cast-iron, and is secured to the bars D and E by flanges and bolts, or by other suitable means, and is connected with the arm $k\,m$ by the rod $p$. It is also connected with the hand-lever L by the rod or bar $q$.

The clutches $g$ are made to move along the axle A by means of a feather and spline or groove and pin, and revolve with the axle. They are moved back and forth by the forks $f$ of the levers $d$, fitting in suitable grooves therein, as shown. The levers $d$ are pivoted to the plate $j'$, and are provided with side projections $e$, which rest upon the plate $j$, to prevent the turning or cramping of the levers. The side projections $e$ have their upper inner corners inclined at $e'$, so that the wedge or incline $i$ will act thereon to detach the clutches by spreading the levers without unnecessary friction or wear. The incline or wedge $i$ is firmly attached to the head $h$ or to the arm $k$, and its sides are inclined, so as to spread the levers $d$ in its forward or descending movement, and thereby release the clutches $g$. Near the forward end of the levers $d$ a spring, $c$, is placed, which spring operates to throw or force the ends of the levers toward each other, and thus keep the clutches $g$ out of contact with the head $h$. It also operates to draw the rods $b$ together, and thus lift the treadle $a$ and keep it in position.

The tension of the spring is regulated by the set-screw or eyebolt $c'$. It is obvious that this spring can be made in two parts, and the parts be located between the levers and the bars J, and produce the same results.

The rods $b$ are push-rods, and are connected with the levers $d$ at their lower ends and to the treadle $a$ at their upper ends by means of a projection, $b'$, or directly, as may be desired. These rods stand at an angle, so that a down-pressure on the treadle operates to spread the levers $d$ and throw the clutches into contact or gear with the head $h$.

The hand-lever L is made and operated in the usual manner, and it is applied so that the rake may be used either as a self or a hand dumper.

The part $r$ of the hand-lever is so connected with the rod $q$ that they can be adjusted and operate as a stop in connection with the arm M to limit the downward movement of the rake-teeth. The hand-lever is also so connected with the arm M, and through that with the arm $m\,k$, that it may be used to force the clutches out of contact with the head $h$ if for any reason the spring $c$ should fail to act.

The rod $q$ may be extended, and its fork connected with the lever L above the pivot, so as to dispense with the part $r$ and reverse the movement of the lever from a pull to a push.

The head or enlargement $l$ at the upper end of $k$ may have teeth on each side, and two arms may be used above, one on each side, instead of the single arm $m$, and a bolt might then be used in place of the set-screw $o$.

What I claim as new, and desire to secure by Letters Patent, is as follows:

1. The combination of the head $h$, loose on the axle A, the two clutches $g\,g$, arm $k$, provided with slotted enlargement $l$, pivoted arm or section $m$, with set-screw $o$, the rod $p$, and the lever M, attached to the rake-head, disconnected from the axle, substantially as and for the purposes herein set forth.

2. The combination of the head $h$ and wedge or incline $i$ with levers $d$, having side projections or arms $e$, substantially as specified.

3. The combination of the head $h$, incline $i$, and clutches $g\,g$ with the levers $d$, having side projections $e$ and forks $f$, substantially as set forth.

4. The combination of the treadle $a$, rods $b$, spring $c$, and levers $d$ with the clutches $g\,g$ and head $h$, substantially as described.

5. The combination of the treadle $a$, rods $b$, levers $d$, having side projections $e$, and the spring $c$ with the clutches $g\,g$, head $h$, and incline or wedge $i$, substantially as specified.

REUBEN ELLWOOD.

Witnesses:
 E. A. WEST,
 O. W. BOND.